United States Patent [19]
Shimada et al.

[11] Patent Number: 5,138,435
[45] Date of Patent: Aug. 11, 1992

[54] CRT-MATRIX DISPLAY WITH INDEXING AND STAIR STEP VERTICAL DEFLECTION WAVEFORM.

[75] Inventors: Satoshi Shimada, Kanagawa; Koji Kanbayashi, Chiba; Ryuichi Kawakami; Takehisa Natori, both of Kanagawa, all of Japan

[73] Assignee: Sony Corporation, Tokyo, Japan

[21] Appl. No.: 493,387

[22] Filed: Mar. 14, 1990

[30] Foreign Application Priority Data

Mar. 17, 1989 [JP] Japan ................................... 1-66985
Mar. 31, 1989 [JP] Japan ................................... 1-82731
Mar. 31, 1989 [JP] Japan ................................... 1-82740

[51] Int. Cl.$^5$ .............................................. H04N 9/24
[52] U.S. Cl. .......................................... 358/67; 358/240
[58] Field of Search ................... 358/67, 240, 241, 242

[56] References Cited

U.S. PATENT DOCUMENTS

| | | | |
|---|---|---|---|
| 4,368,485 | 1/1983 | Midland | 358/242 X |
| 4,635,105 | 1/1987 | Favreau | 358/67 |
| 4,635,106 | 1/1987 | Shinkai | 358/68 |
| 4,658,288 | 4/1987 | Midland | 358/67 |
| 4,872,060 | 10/1989 | Micic et al. | 358/242 |
| 5,010,413 | 4/1991 | Bahr | 358/242 |
| 5,057,739 | 10/1991 | Shimada | 313/477 R |

FOREIGN PATENT DOCUMENTS 63-129795 6/1988 Japan.

Primary Examiner—James J. Groody
Assistant Examiner—Mark R. Powell
Attorney, Agent, or Firm—Hill, Van Santen, Steadman & Simpson

[57] ABSTRACT

A CRT-matrix type big screen display system having self-emitting type picture cells is provided with a deflection waveform as a sawtooth waveform and a deflection waveform in the other direction as a step deflection waveform crossing the picture cells. Inclination of the scanning line is eliminated so that fluctuations in display brightness thereto are avoided and a satisfactory picture display is achieved. Also in CRT-matrix type big-screen display systems, index elements or cells are provided between sets of primary color cells and in the scanning direction. At least at the start of the scanning operation, the index elements or cells are scanned and the positional information thereof is stored in a memory for use in processing a video signal to achieve a satisfactory picture display. Furthermore, prior to reproducing a picture, a photo pickup equipment is slidably moved across the big screen and positional information of primary color cells sensed thereby is stored in a memory, which positional information is used in processing a video signal so that a satisfactory picture is displayed.

6 Claims, 15 Drawing Sheets

FIG. 11A  Sℓ  
FIG. 11B  Sf  
FIG. 11C  $S_{Wℓ}$  
FIG. 11D  $\phi_0$ (Sx)  
FIG. 11E  $\phi_1$  
FIG. 11F  $\phi_2$  
FIG. 11G  $\phi_3$  
FIG. 11H  $S_{Tf}$  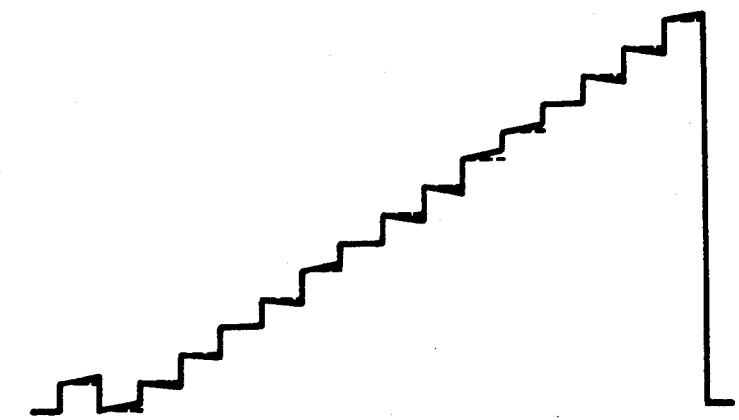

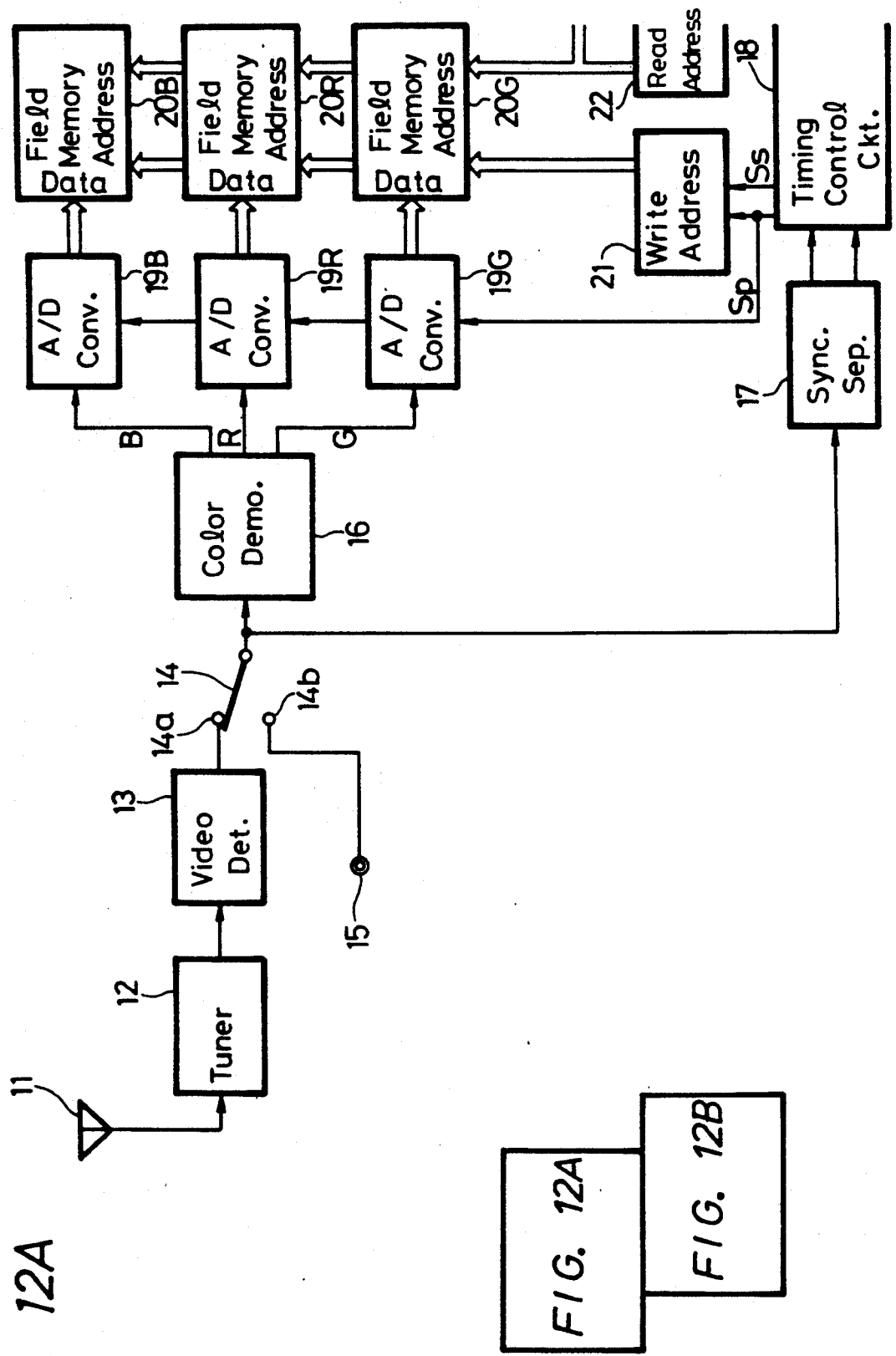

FIG. 16A  Sℓ 
FIG. 16B  Sf 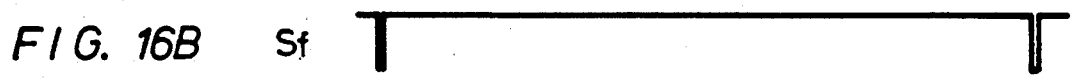
FIG. 16C  Swℓ 
FIG. 16D  $\varphi_1$ 
FIG. 16E  $\varphi_2$ 
FIG. 16F  $\varphi_3$ 
FIG. 16G  STf 

CRT-MATRIX DISPLAY WITH INDEXING AND STAIR STEP VERTICAL DEFLECTION WAVEFORM.

BACKGROUND OF THE INVENTION

1. Field of the Invention

The present invention is related generally to a display system and is, more particularly, directed to a big-screen display system in which a plurality of picture tubes are arranged in an X-Y matrix form.

2. Description of the Related Art

Big-screen display systems in which television signals and the like are displayed are known in the prior art. For example, it has been proposed to provide a plurality of display devices such as color cathode ray tubes or the like assembled together in vertical and horizontal directions for displaying a picture in a divided condition. However, when this display apparatus is used, non-display portions, such as the connecting portions between the cathode ray tubes or the like form lines, such as black lines, within the display screen. These lines disturb the viewer looking at the displayed picture.

An alternate proposal provides a number of single color or three primary color display elements arranged in a so-called matrix format to display a picture in units of picture cells. In this type of display apparatus, the shape of each display cell cannot be miniaturized as is desired. Furthermore, the pitch of the picture cells is so large that the reproduced picture can not be effectively seen at close range.

To overcome the aforementioned defects, the assignee of the instant application has previously proposed a big screen display element, in co-pending U.S. application Ser. No. 458,456, filed Dec. 28, 1989 now U.S. Pat. No. 5,057,739. This previously proposed big-screen display element will be described hereinafter with reference to the Figures.

FIG. 1A is a side cross section of a big-screen display element, FIG. 1B is a front view of the display element and FIG. 1C is an enlarged front view of a portion of the display element of FIG. 1B. In FIG. 1A, a tube envelope, referenced numeral 1 includes a glass front panel 2 and a necked-down funnel portion 3 unitarily formed together.

As shown in FIG. 1B, an inner surface of the front panel 2 is provided with a plurality of sets of stripe shaped fluorescent display portions which are referred to as picture cells or trios 4. In the illustrated example, the picture cells or trios 4 are arranged in an 8×8 matrix so that there is a total of 64 sets of fluorescent display cells or trios 4 on the panel 2. As seen in FIG. 1B and in greater detail in FIG. 1C, each of the fluorescent display trios is composed of blue, red and green fluorescent layers, B, R and G, each having a length L and a width W. The fluorescent display trios 4 are arranged on a display screen 5 on the front panel 2 at a predetermined pitch P, and further are arranged with their longitudinal directions corresponding to the horizontal direction. The surface portions of the display screen 5 which is not provided with the fluorescent layers B, R and G are provided with a light absorbing layer, not shown, formed thereon.

The front panel 2 and the funnel portion 3 of the tube envelope 1 are connected to each other by a glass frit method. For example, a stepped portion is formed on the inner peripheral surface of the flat-shaped front panel 2, and the funnel portion 3 is bonded to the front panel 2 with the funnel portion 3 engaging the stepped portion. The outer peripheral surface of the funnel portion 3 in the region of the funnel portion which is bonded to the front panel 2 is formed to lie perpendicular to the surface of the front panel 2. The fluorescent trios 4 may be formed on the front panel 2 by a printing method or by a slurry method.

In the tube envelope 1 of FIG. 1A is provided an electron gun 6 which is utilized to emit a single electron beam e. The electron beam e is sequentially modulated on the basis of a video signal for the three primary colors by a switching operation. Accordingly, the electron beam e is vertically and horizontally deflected by a deflection yoke 7 so that it impinges upon the blue, red and green fluorescent layers B, R and G of the fluorescent trio 4. It is preferred that the electron beam e be of a shape so that its cross section is oblong in the lateral direction so as to correspond with the shape of each of the fluorescent layers.

In this example, the fluorescent trios 4 are arranged with the longitudinal direction corresponding to the X direction with reference to FIG. 1C so that scanning of the electron beam e is not carried out by the prior art scanning method in which an electron beam impinges fluorescent layers while scanning in a horizontal direction, but instead is carried out by a scanning method in which the electron beam e impinges the fluorescent layers B, R and G while scanning the electron beam e in a vertical direction. The illustrated cathode ray tube thus forms a display element 8 for a display.

Accordingly, as shown in FIGS. 2A and 2B, a number of the thus constructed display cells 8 are arranged in a two-dimensional fashion in an X and Y matrix form, making it possible to construct a big-screen CRT-matrix type display apparatus 9. In the illustrated display apparatus 9, the pitch P of the fluorescent trios 4, including between the adjacent display elements 8, is constant, as shown in FIG. 3.

As a practical example, 30 such display cells 8 are arranged in a longitudinal direction and 40 display cells 8 are arranged in a lateral direction to construct a big-screen CRT-matrix type display apparatus 9 having 1200 total display cells 8.

Big screen CRT-matrix type display apparatus 9 may be constructed as described above. In this display apparatus, the shape of the pixel elements can be reduced in size by utilizing the above-mentioned display cells 8 so that the displayed picture can be satisfactorily seen from short distances. Furthermore, the pitch of the pixel elements is constant so that smear due to non-display portions is avoided.

Furthermore, by utilizing the above-mentioned display cells, it possible to increase the angular range within which the picture may be satisfactorily seen at the proper distance. More precisely, in the display cell 8 as described above, the front panel 2 is located in front of the respective fluorescent layers B,R and G with the result that a frame having a depth corresponding to the thickness of the front panel 2 is provided around the display screen 5 for each of the display cells 8.

With reference to FIG. 4A, the known display cells of this kind are shown with the fluorescent trios having their longitudinal directions arranged vertically, as shown in the horizontal cross section. When this known display screen 5' is viewed from an angle of greater than $\Theta_1$, then a portion of a frame FR hides either the green phosphor layer G or the blue phosphor layer B at the edges thereof to attenuate the display of either the blue or green colors. This results in smearing of the image in which the hue is deviated, such as to yellow, at each side edge of the display cells 8. On the other hand, if the fluorescent trios are arranged with their longitudinal directions in a horizontal direction as shown in the horizontal cross section of FIG. 4B, then the display screen 5 may be viewed from a greater angle. The brightness of a pixel element at the edge of the display cell 8 is attenuated by the frame FR by a very small amount and disturbing errors such as a change in hue or the like is avoided. Therefore, the display screen 5 may be satisfactorily viewed from a wider range, such as angle $\Theta_2$, in the horizontal direction. In normal viewing conditions, an extended viewing angle in the vertical direction can be avoided.

As described above, the display cell 8 and the big-screen display apparatus 9 utilizing the above described display cells 8 have various advantages.

In the above-described display cell 8 the scanning of the electron beam e is performed once in the horizontal scanning direction, or field scanning, and eight times in the vertical scanning direction, or line scanning, for the scanning of one field. In this case, if the scanning is performed with sawtooth wave signals $f_H$ and $f_V$, a shown in FIGS. 5A and 5B, and as is similar to the known prior art methods, then the line scanning is performed only 8 times so that the scanning line is inclined at about 7° due to the influence of the field scanning. This is shown in FIG. 6A. This type of scanning results in the scanning lines not crossing the center of all fluorescent trios B, R and G, with the result that the brightness of the display is irregular. In FIGS. 6A and 6B, a solid line represents a scanning period and a broken line represents a blanking period of the electron beam e.

On the other hand, as shown in FIG. 6B, by providing a deflection yoke at an inclination angle to perform the scanning, it is possible to have the scanning line cross the centers of all of the fluorescent layers B, R and G. To perform the scanning in accordance with the shape of the display screen 5 according to this method, the scanning width and the scanning position must be adjusted for each scanning line, which requires a very complicated control operation.

Further, in the display screen 8, the electron beam e is, for example, a single oblong electron beam as described above. When the respective fluorescent layers B, R and G of the above-described fluorescent trio 4 are impinged by the electron beam e of the video signals of corresponding colors, the video signal for modulating the electron beam must be changed over, for example, by a switching operation. In this case, the prior art proposes a so-called index system for a cathode ray tube.

In the prior art standard cathode ray tube, a non-display portion is formed around the display screen and a so-called run-in index is provided in the non-display portion. This enables the switching operation to be performed stably from the end portion of the display screen. On the other hand, in the above-mentioned display cell 8, the non-display portion formed around the display screen 5 is narrow, and is less than one-half of the pitch P at which the fluorescent trios 4 are provided. As a result, the run-in index can not be provided.

Furthermore, it is proposed to provide three electron beams and a so-called shadow mask and an aperture grill. This proposal, however, requires a complicated arrangement and is disadvantageous in miniaturizing the display cells 8.

SUMMARY OF THE INVENTION

It is an object of the present invention to provide an improved big-screen display system which eliminates the defects encountered in the prior art.

More specifically, it is an object of the present invention to provide a big-screen display system having a simplified arrangement which can provide an excellent display without irregularities in brightness.

According to a first aspect of the present invention, a big-screen display system is comprised of a plurality of picture tubes arranged in an X-Y matrix form, each of the picture tubes having a picture screen, a plurality of strip-shaped self luminous color pixel elements arranged in at a predetermined pitch on the picture screen, the color pixel elements including a plurality of different primary color elements, an electron gun for emitting an electron beam onto the color pixel elements, a signal source for supplying a corresponding plurality of different primary color signals to the electron gun of the plurality of picture tubes, and a deflection device for deflecting the electron beam of the picture tube in vertical and horizontal directions. The big-screen display system is characterized in that an indexing device is provided to selectively apply the primary color signals to the electron gun in synchronism with the position of the electron beam such that the corresponding primary color pixel elements are impinged thereby, and the deflection device includes a first signal generator generating a sawtooth wave signal for deflecting the electron beam in one direction and a second signal generator generating a step wave signal for deflecting the electron beam in the other direction.

According to a second aspect of the present invention, a big-screen display system is comprised of a plurality of picture tubes arranged in an X-Y matrix form, each of the picture tubes having a picture screen, a plurality of strip-shaped self luminous color pixel elements arranged at a predetermined pitch on the picture screen, the color pixel elements including a plurality of different primary color elements, an electron gun for emitting an electron beam onto the color pixel elements, a signal source for supplying a corresponding plurality of different primary color signals to the electron guns of the plurality of picture tubes, and a deflection device for deflecting the electron beam of each picture tube in the vertical and horizontal directions. The big-screen display system is characterized by an indexing device including photo detecting equipment which is movably attached to the front surface of the big screen formed by the plurality of picture screens for detecting the position of the electron beam, a memory for storing the positional data obtained thereby, and a controller for selectively applying the primary color signals to the electron gun in response to the positional data stored in the memory.

In accordance with a third aspect of the present invention, a big-screen display system is comprised of a plurality of picture tubes arranged in an X-Y matrix form, each of the picture tubes having a picture screen, a plurality of stripe-shaped self luminous pixel elements arranged at a predetermined pitch on the picture screen, and an electron gun for emitting an electron beam onto the pixel elements, and a deflection device for deflecting the electron beam of each picture tube in the vertical and horizontal directions. The big-screen display system is characterized in that the deflection device includes a first signal generator for generating a sawtooth wave signal which deflects the electron beam in one direction, and a second signal generator generating a step wave signal for deflecting the electron beam in the other direction.

In accordance with a fourth aspect of the present invention, a big screen display system is comprised of a plurality of picture tubes arranged in an X-Y matrix form, each of the picture tubes having a picture screen, a plurality of striped-shaped self luminous color pixel elements arranged at a predetermined pitch on the picture screen, the color pixel elements including a plurality of different primary color elements, a plurality of index elements arranged between the color pixel elements at a predetermined pitch on the picture screen corresponding to the predetermined pitch of the color pixel elements, an electron gun for emitting an electron beam onto the color pixel elements and the index elements, a signal source for supplying a corresponding plurality of different primary color signals to the electron guns of the plurality of picture tubes, and a deflection device for deflecting the electron beam of each picture signal in the vertical and horizontal directions. The big-screen display system is characterized in that an indexing element includes a photo detector provided to detect the positional data of the index elements for selectively applying the primary color signals to the electron gun in synchronism with the detected data so that the corresponding primary color pixel elements are impinged thereby, and the deflection device includes a first signal generator generating a sawtooth wave signal for deflecting the electron beam in one direction and a second signal generator generating a step wave signal for deflecting the electron beam in the other direction.

The above, and other objects, features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

FIGS. 11A through 11H are waveform diagrams to which reference will be made in explaining the operation of circuit shown in FIG. 10;

FIGS. 16A through 16G are waveform diagrams to which reference will be made in explaining the operation of the circuit shown in FIG. 13.

DESCRIPTION OF THE PREFERRED EMBODIMENTS

The present invention will now be described with reference to the drawings.

Figure 1C:
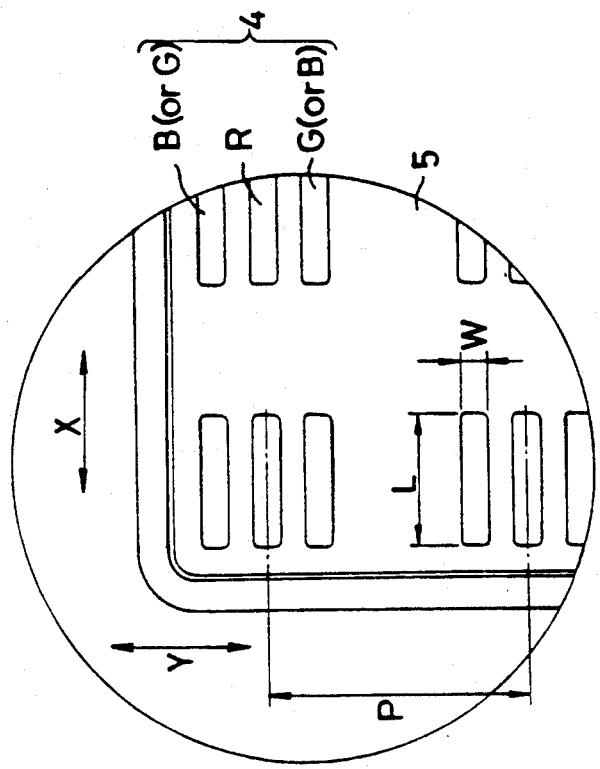
FIG. 1C is an enlarged view of a portion of the front shown in FIG. 1B of a known display device as proposed in the co-pending U.S. patent application and which has been explained in the foregoing.
Figure 1B:
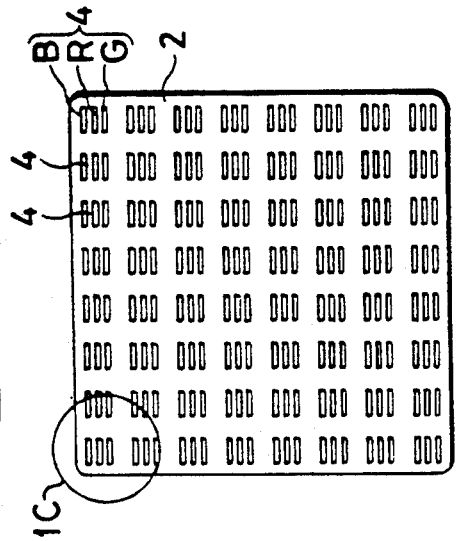
FIG. 1B is a front view of the display element of FIG. 1A
Figure 1A:
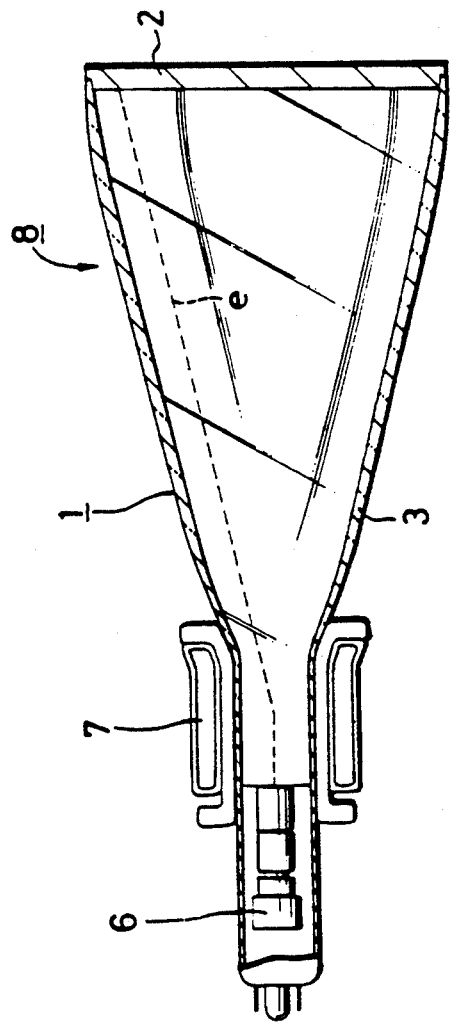
FIG. 1A is a cross section view of a known display element.
Figure 2B:
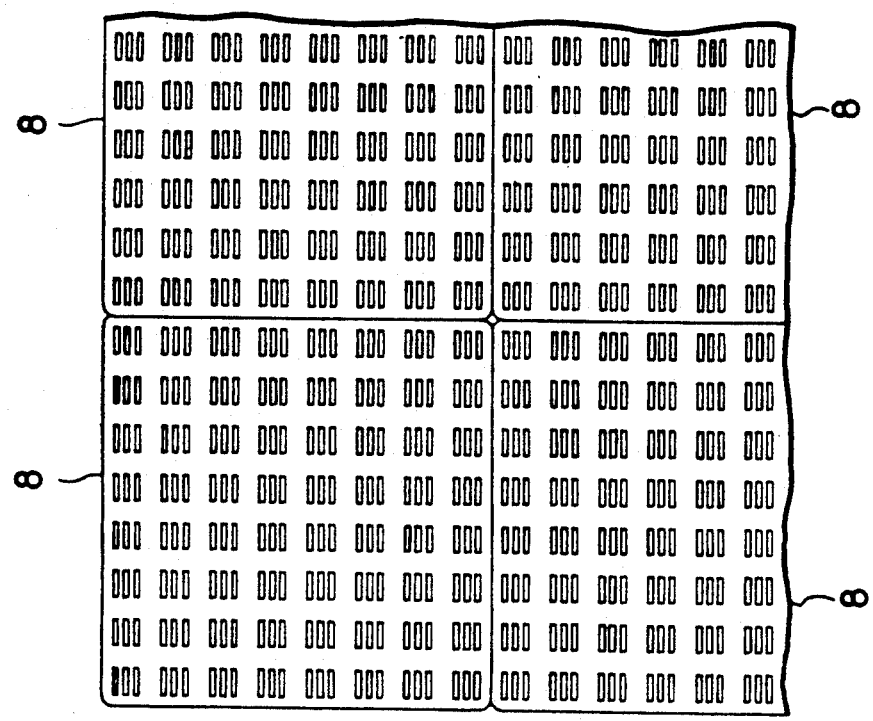
FIGS. 2A and 2B are a side cross section and a front view, respectively, of a portion of a big-screen display system as known and has been explained.
Figure 2A:
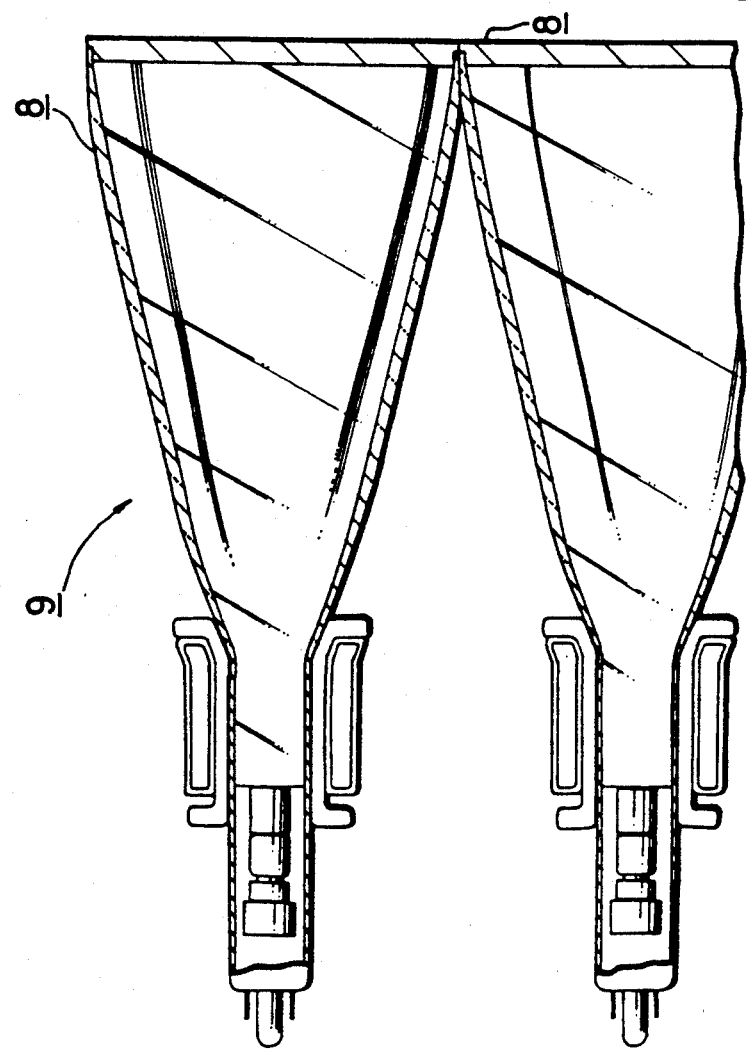
Figure 3:
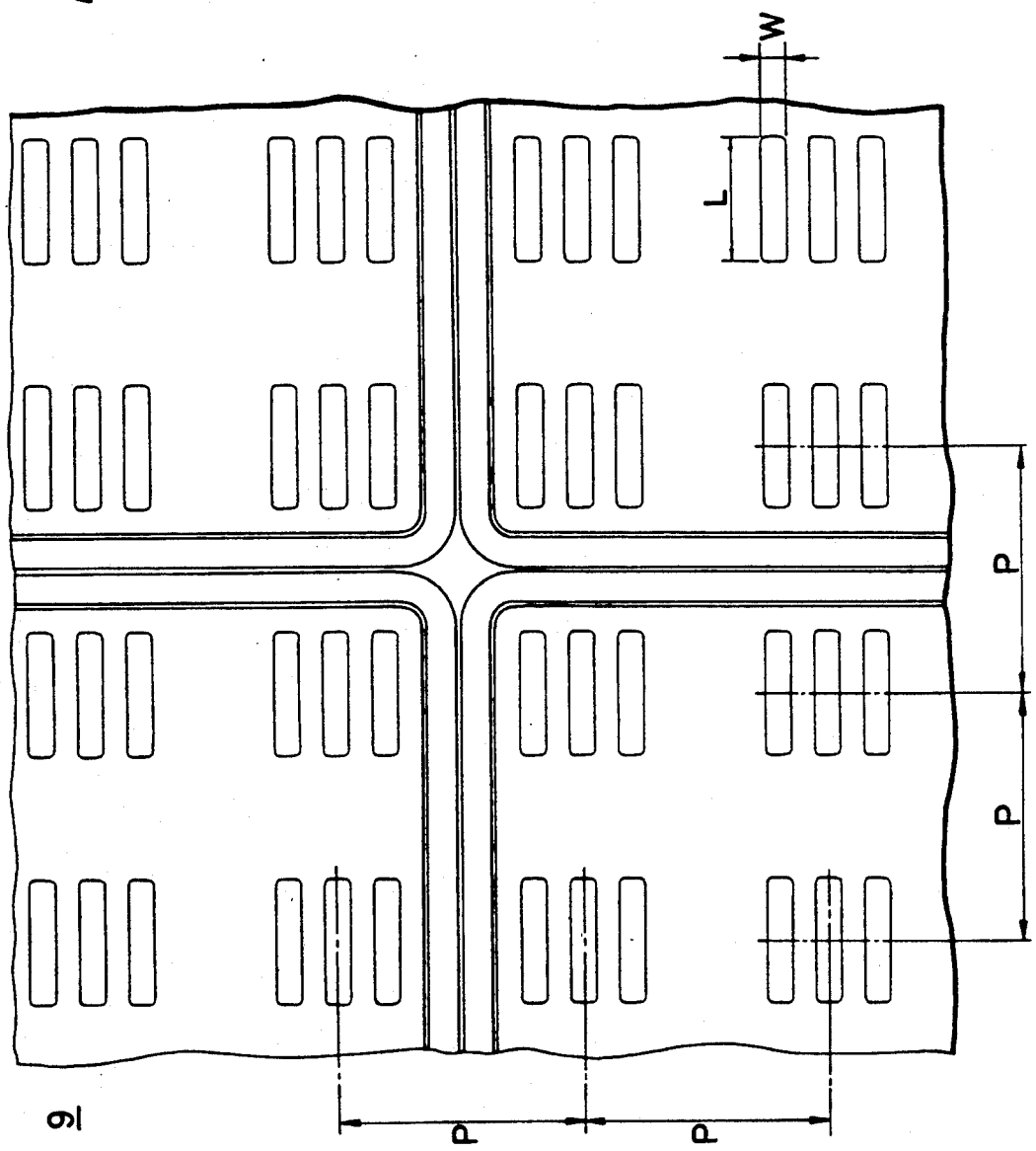
FIG. 3 is an enlarged front view of a portion of the big-screen display system of FIG. 2B.
Figure 4A:
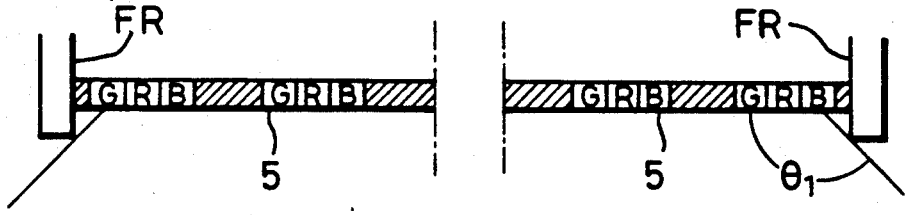
FIGS. 4A and 4B are horizontal cross sections of two embodiments of a display screen showing the viewing angle.
Figure 4B:
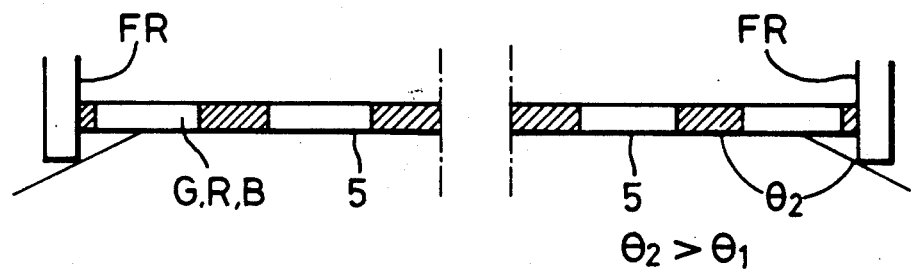
Figure 5A:
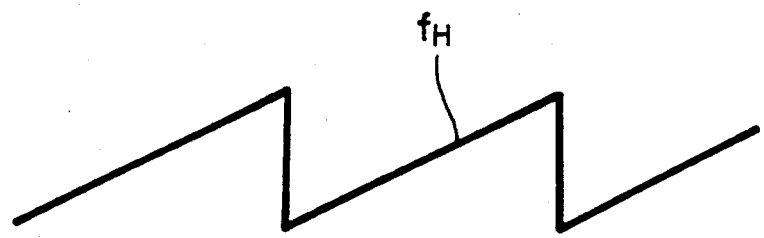
FIGS. 5A and 5B are signal diagrams of a horizontal and a vertical scanning signal, respectively, for a known display element.
Figure 5B:
Figure 6A:
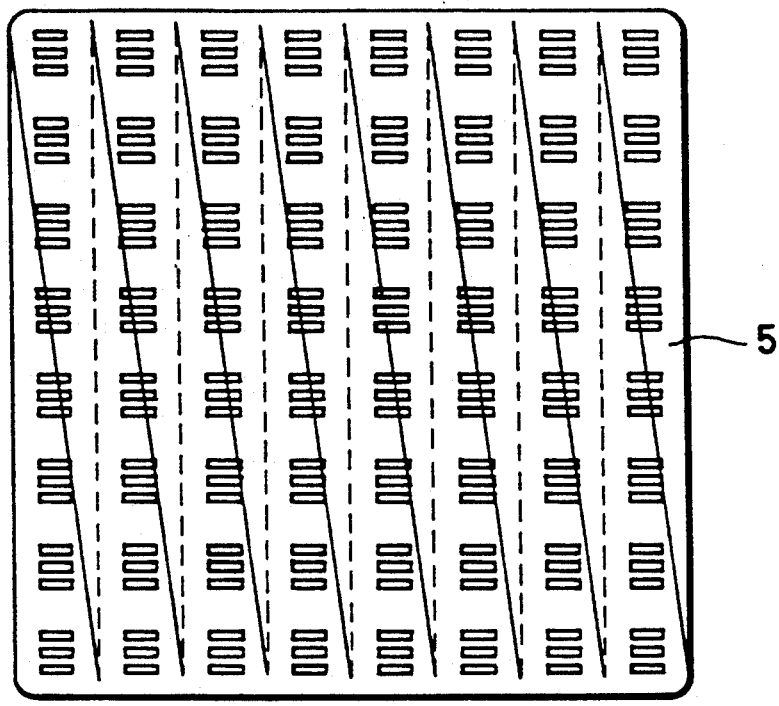
FIGS. 6A and 6B are front views of display screens showing electron beam scanning patterns as has been explained hereinabove.
Figure 6B:
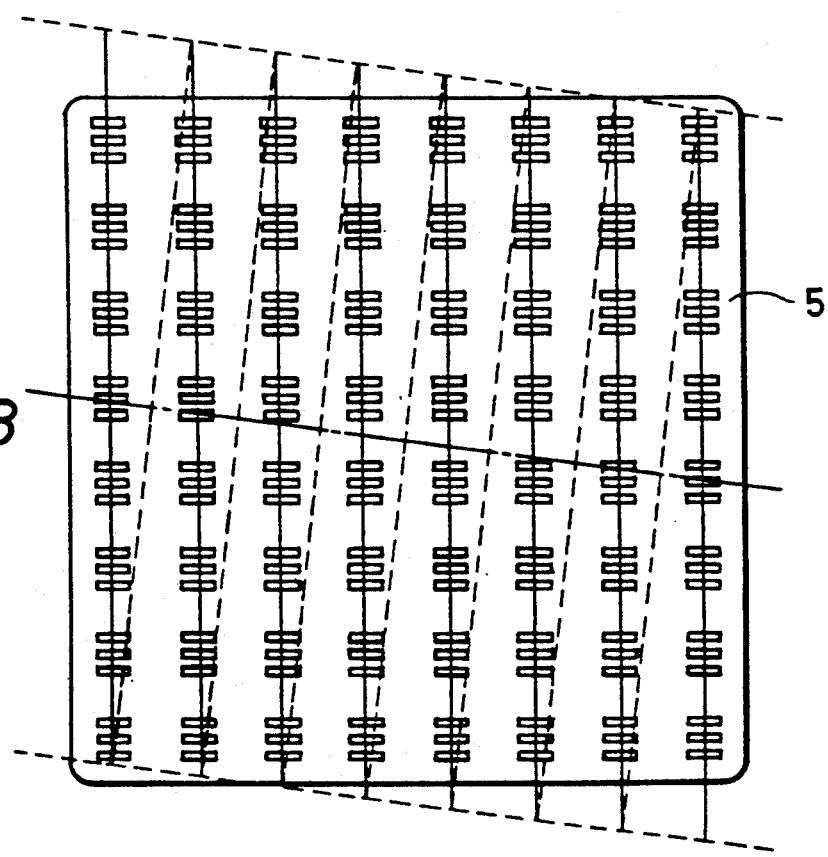
Figure 7:
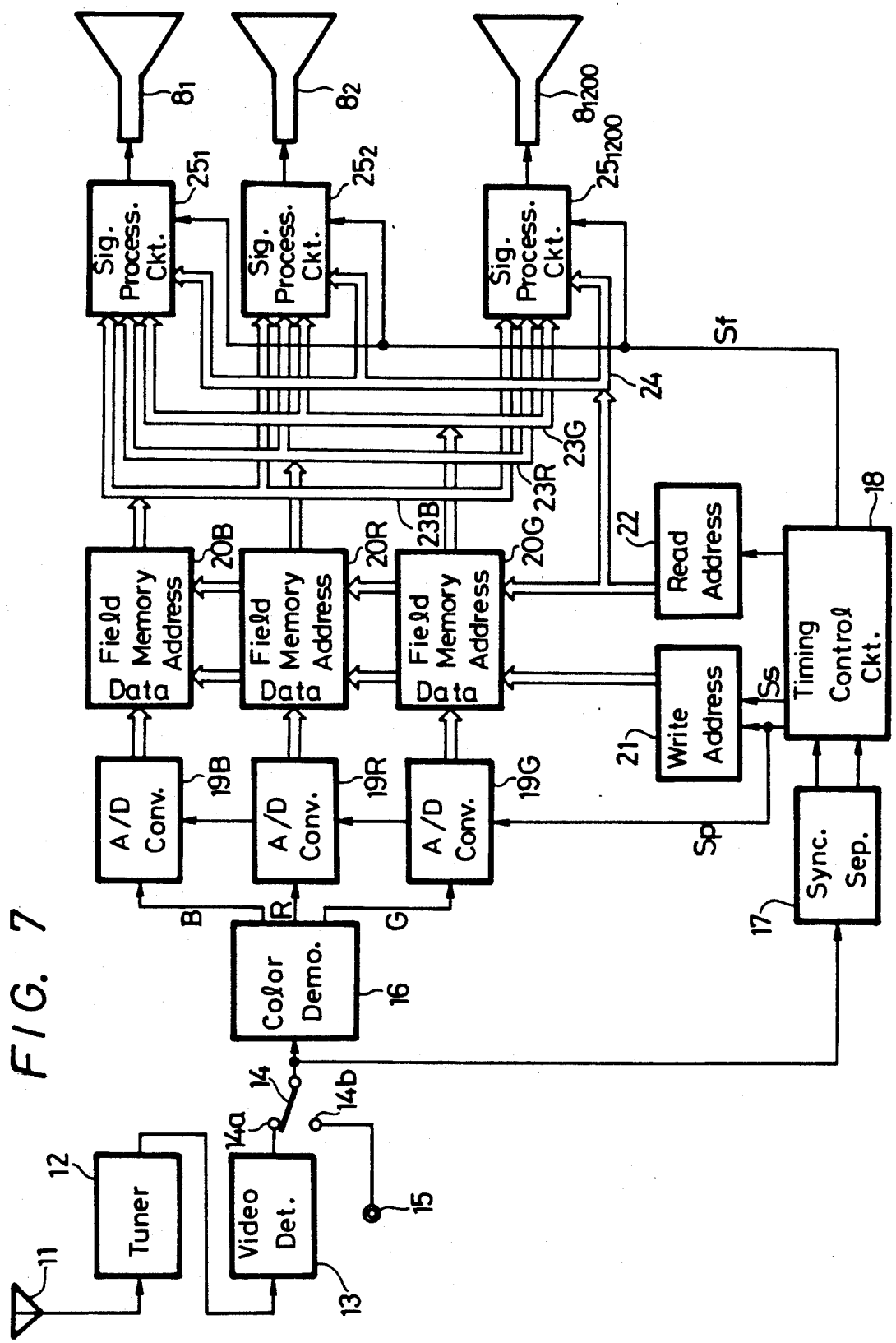
FIG. 7 is a block circuit diagram showing an embodiment of an overall circuit arrangement for a CRT-matrix type video display system in accordance with the present invention.

FIG. 7 shows an example of an overall circuit arrangement of a signal system. In FIG. 7, a signal from an antenna 11 is supplied to a tuner 12, whereby a desired television signal or the like is received. The received signal is supplied to a video detector circuit 13 which demodulates the signal to provide a composite video signal. The composite video signal which has been demodulated is supplied to one fixed contact 14a of an input selection switch 14. A composite video signal which is input to an external video input terminal 15 may be supplied to another fixed contact 14b of the switch 14. A signal selected by the switch 14 is supplied to a color demodulator circuit 16 in which the signal is demodulated to provide blue (B), red (R) and green (G) color signals as the three primary colors.

The signal from the switch 14 is also supplied to a synchronizing (sync.) separator circuit 17, in which it is separated to provide horizontal and vertical synchronizing signals. The horizontal and vertical synchronizing signals are supplied to a timing control circuit 18 which generates a sampling signal Sp that is used to divide a horizontal effective picture period equally by 320. The sampling signal Sp is commonly supplied to analog-to-digital (A/D) converters 19B, 19R and 19G for the three color channels.

The three primary color signals from the above-described color demodulator circuit 16 are supplied to the respective analog to digital converters 19B, 19R and 19G in which they are converted from analog to digital signals of, for example, 8 bits at the timing of the sampling signal Sp. The digital color signals are supplied to field memories 20B, 20R and 20G, respectively.

The sampling signal Sp and a start signal Ss corresponding to an upper peripheral point of the effective picture screen are supplied from the timing control circuit 18 to a write-address generator circuit 21. A write-address signal from the write-address generator circuit 21 is supplied to the field memories 20B, 20R and 20G. During one field period of a video signal, for example, 320×240 (horizontal scanning lines number)=76800 video signal data forming the one field are written into the field memories 20B, 20R, and 20G separately in primary colors.

On the other hand, in association with the memories 20B, 20R and 20G, in which the data are written, a clock signal from the timing control circuit is supplied to a read-address generator circuit 22, and a read-address signal derived from the read-address generator circuit 22 is supplied to the field memories 20B, 20R and 20G. This results in a read-out of video signal data being supplied to data buses 23B, 23R and 23G, respectively. Furthermore, the address signal form the read-address signal generator 22 is supplied to an address bus 24. Signal processing circuits $25_1$ through $25_{1200}$ are provided for the above-described 1200 display cells $8_1$, $8_2$, ... $8_{1200}$, which are connected to the data buses 23B, 23R, and 23G.

Figure 8:
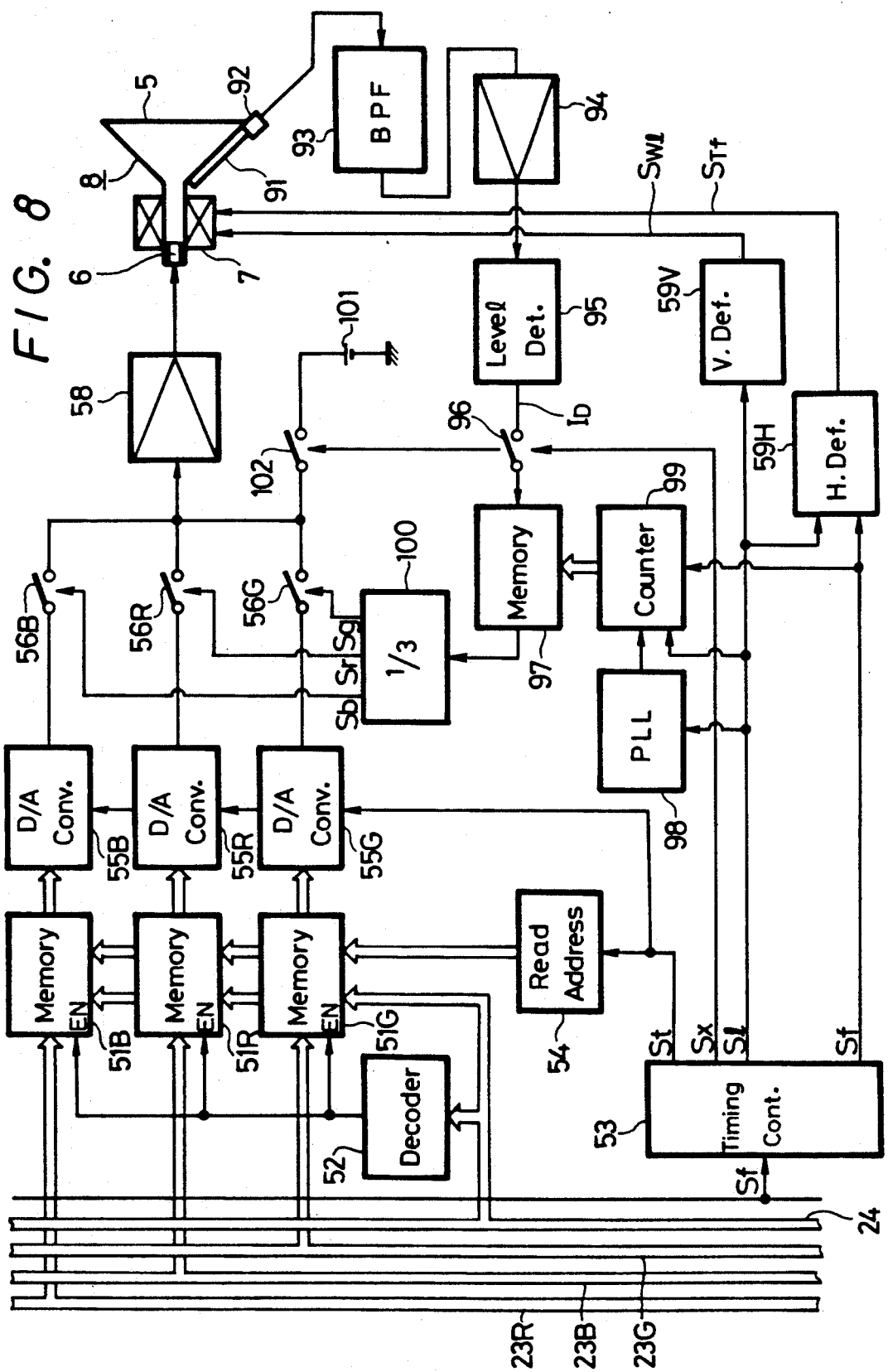
FIG. 8 is a block circuit diagram of a practical circuit arrangement of a signal processing circuit for use in the circuit of FIG. 7.

An arrangement for one of the signal processing circuits 25 is shown in FIG. 8.

With reference to FIG. 8, data signals from the data buses 23B, 23R, and 23G and the address signal from the address bus 24 are supplied to memories 51B, 51R and 51G, each having a storage capacity of 64 data units to drive one display cell 8. One portion of the address signal is supplied to a decoder 52. Signals are generated from the decoder 52 only when address data signals are required by the memories 51B, 51R and 51G, and are respectively supplied to memory enabling terminals EN of the memories 51B, 51R and 51G. The data for 64×3 primary color signals displayed by the corresponding display cells 8 are thereby written in the memories 51R, 51B and 51G.

A synchronizing signal Sf corresponding to the vertical synchronizing signal of the video signal from the timing control circuit 18 is supplied to another timing control circuit 53 provided in each signal processing circuit 25.

For the memories 51B, 51R and 51G in which the data are written, the timing control circuit 53 generates a timing signal St which is provided by dividing the interval, for example, of the vertical synchronizing signal Sf equally by 64. The resulting timing signal St is supplied to a read-address signal generator circuit 54. The read-address signal generator circuit 54 generates a read-address signal which is supplied to the memories 51B, 51R and 51G. Further, the timing signal St is supplied in common to digital-to-analog converters 55B, 55R and 55G of the three channels, and data read-out from the memories 512B, 51R and 51G are supplied to the digital-to-analog converters 55B, 55R and 55G, respectively.

The digital-to-analog convertors 55B, 55R and 55G under the timing control of the timing signal St sequentially convert 64 data units to analog form. In this case, the data units are read-out in such an order that the data are sequentially read from the pixel on the left end column at the upper most location to its lowest location on the display screen 5, and the column is sequentially moved from left to right. The signals from the digital-to-analog to converters 55B, 55R and 55G are supplied to selecting switches 56B, 56R and 56G, respectively.

A frequency dividing circuit 100, which will be described later, transmits selecting signals Sb, Sr and Sg corresponding to the respective colors of the fluorescent layers, the selecting signals Sb, Sr and Sg control the selecting switches 56B, 56R and 56G. Signals selected by the switches 56B, 56R and 56G are mixed and supplied through a drive amplifier 58 to the electron gun 6 of the picture cell 8. A predetermined voltage from a voltage source 101 is supplied through a switch 102 to the amplifier 58 and thereby supplied through the amplifier 58 to the electron gun of the picture cell 8.

The above-described timing control circuit 53 transmits the signal Sf through unchanged and generates a signal Sl by multiplying the signal Sf in frequency by 16. This signal Sl is supplied to a vertical deflection circuit 59V which derives a sawtooth wave signal $S_{wl}$ synchronized with the signal Sl. The sawtooth wave signal $S_{wl}$ is supplied to a vertical deflection coil in the deflection yoke 7 for the picture cell 8. The signals Sf and Sl are both supplied to a horizontal deflection circuit 59H which derives a step wave deflection signal $S_{Tf}$ synchronized with the signals Sf and Sl. The step wave deflection signal $S_{Tf}$ is supplied to the horizontal deflection coil in the deflection yoke 7.

Figure 9:
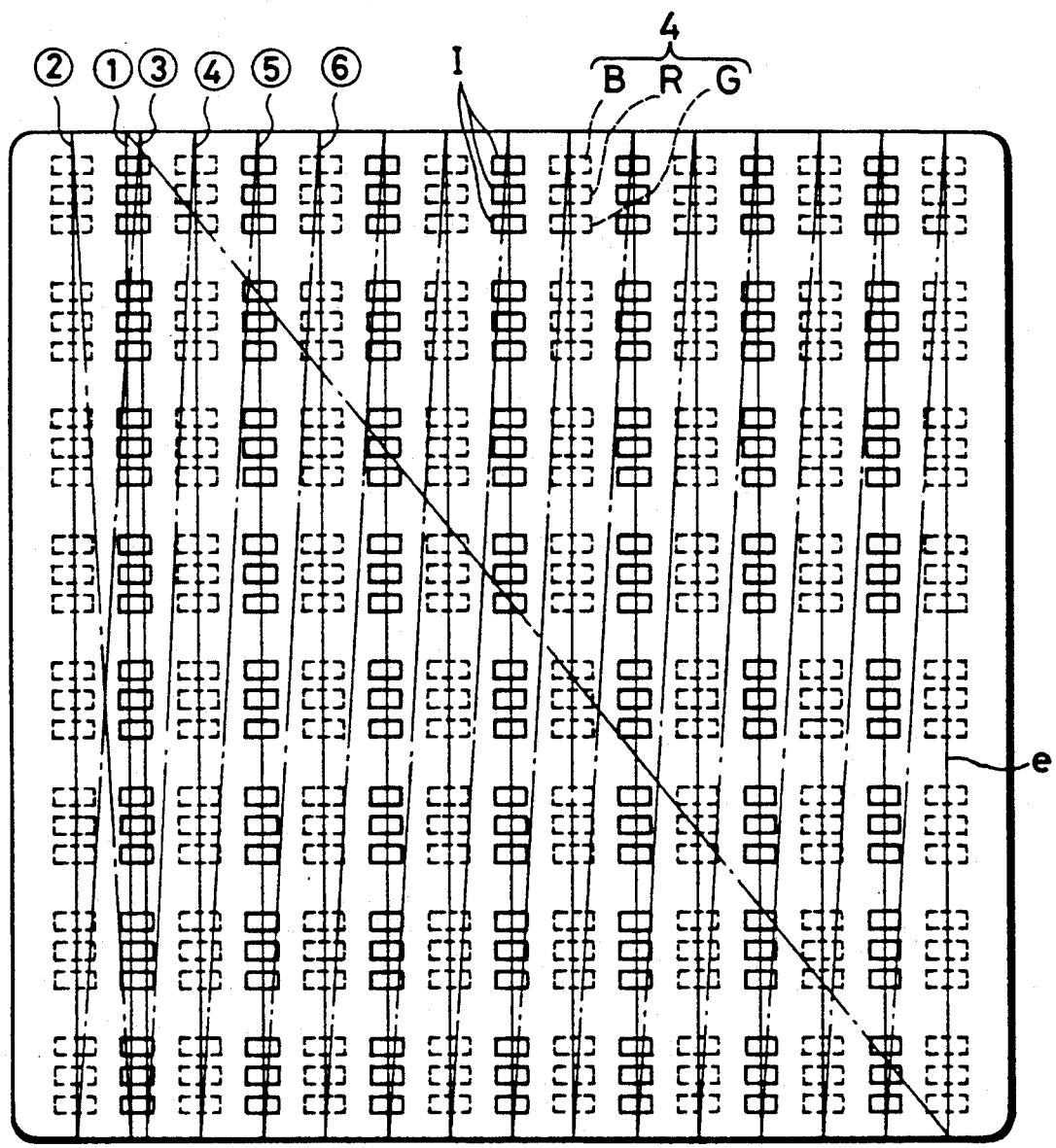
FIG. 9 is a front schematic diagram of a display device for use with the circuits of FIGS. 7 and 8.

Referring to FIG. 9, a rear surface (i.e. the surface facing the electron gun 6), of the display screen is shown. The primary color element sets, also referred to as fluorescent trios 4 are shown in broken outline and located between the fluorescent trios 4 in solid outline are index elements I. The single electron beam e is used to scan the display screen 5 under the control of the deflection waveform formed by the signal Sf and the signal Sl which results from multiplying the signal Sf by 16. The scanning of the electron beam e on the display screen 5 is shown by solid and dashed lines in FIG. 9.

Initially, a portion of the index elements I in the left most column of index elements I is scanned by the electron beam e, as shown at ①in FIG. 9. Next, the portion of the fluorescent trios 4 in the leftmost column is scanned at ②, followed by the leftmost column of index elements I which were previously scanned in step ① being scanned again at step ③. Next, the second column from the left of the fluorescent trios 4 is scanned in step ④, followed by alternate scanning of the index elements I and the fluorescent trios 4 in steps ⑤ and ⑥ etc.

Light emissions are produced from scanning of the index elements I in the above-described scanning, the light emissions being collected by a photo pickup plate 91 shown in FIG. 8 provided in the vicinity of the funnel portion 3 of the display cell 8. The light emissions collected by the pickup plate 91 are supplied to photo detector 92. The signal from the photo detector 92 is supplied through a noise eliminator bandpass filter 93 and an amplifier 94 to a level detector 95. The level detector 95 derives a signal $I_D$ indicating the timing of the light emissions from the index elements I. The signal $I_D$ is supplied through a switch 96 to a memory 97. The switch 96 as well as the above described switch 102 is turned ON by a signal $S_X$ from the timing control circuit 53, the signal $S_X$ going to a high level "1" during the scanning period of the index elements I.

The signal Sl from the timing control circuit 53 is supplied to a phase locked loop (PLL) 98 from which there is derived a clock signal of, for example, about 25 kHz synchronized with the signal Sl. The clock signal is supplied to a count input terminal of a counter 99, while the signal Sf is supplied to a reset terminal R of the counter 99. The count output of the counter 99 is supplied to the memory 97.

Therefore, the counter 99 produces a count value corresponding to the scanning of the electron beam e, and positional information is stored in the memory 97 in response to the signal $I_D$ corresponding to the position of the index elements I as a scan information. During the period except when the signal $S_X$ is high, the counter 99 is driven in the same fashion, and the aforementioned scanning information is read out from the memory 97 in response to the count value from the counter 99. The scanning information is supplied to the ⅛ frequency divider circuit 100 from which their are derived the selection signals Sb, Sr and Sg corresponding to the scanning positions of the fluorescent layers B, R and G located in the similar positions as that of the index elements I.

As described above, and as shown in FIG. 9, when the index elements I are located between the primary color elements sets 4 and in the scanning direction, at least in the scanning start time, the index elements I are scanned and the positional information thereof is stored in the memory 97, whereby the video signal can be processed in accordance with the positional information from the memory. Thus, a satisfactory picture can be displayed by a simplified arrangement.

Figure 10:
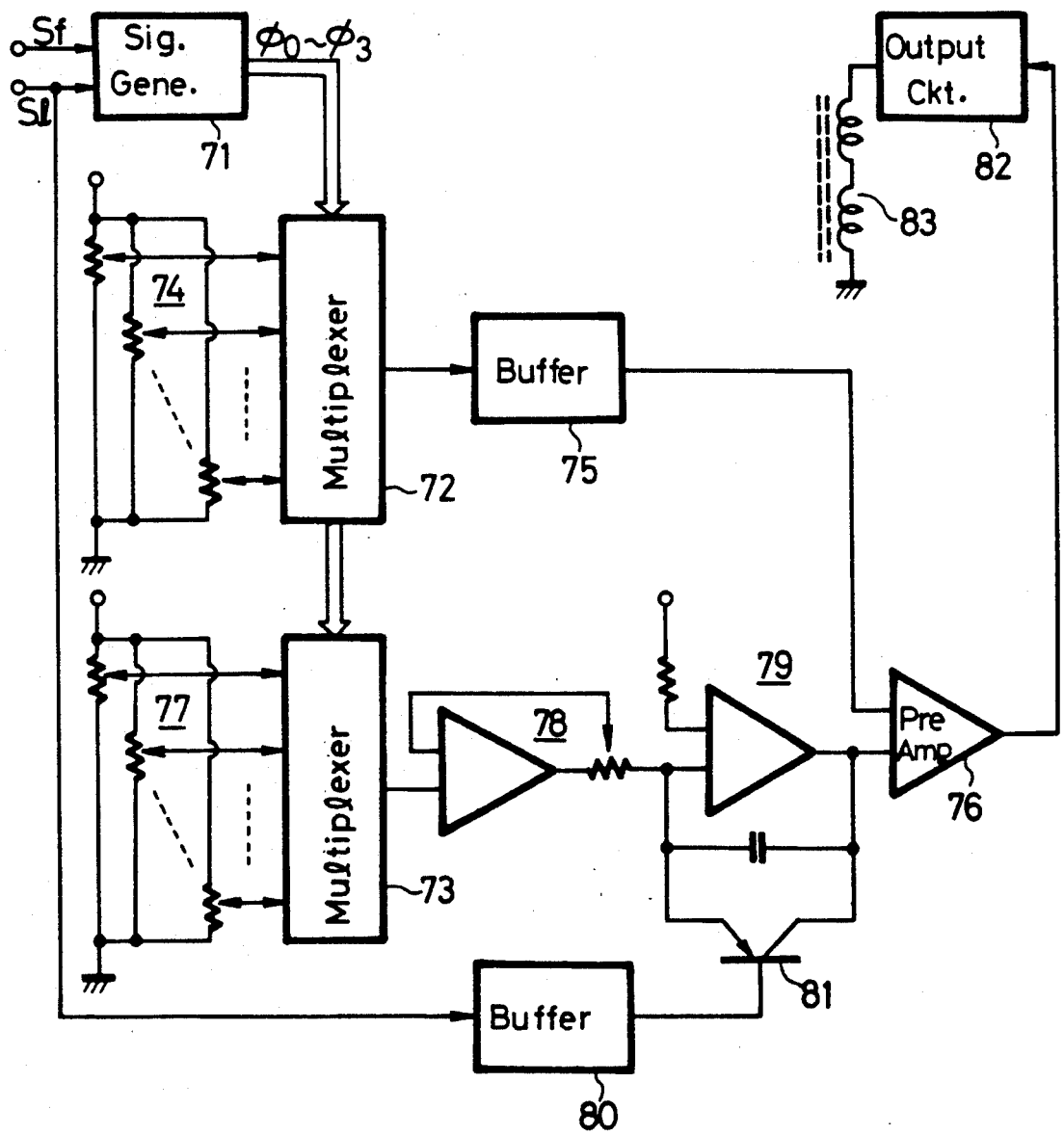
FIG. 10 is a block circuit diagram of a practical circuit arrangement for a horizontal deflection circuit for use in the circuit of FIG. 8.

An example of the horizontal deflection circuit 59H which generates the step wave $S_{Tf}$ is shown in FIG. 10.

In FIG. 11A is shown a signal diagram of the signal Sl while FIG. 11B shows a signal diagram of the signal Sf which are supplied to a signal generator circuit 71 of the horizontal deflection circuit 59H shown in FIG. 10. The signal Sl is also supplied to the vertical deflection circuit 59V of FIG. 8 and from this signal, the vertical deflection circuit 59V generates a sawtooth wave signal $S_{W1}$ as shown in FIG. 11C. The illustrated sawtooth wave signal $S_{W1}$ is supplied to the vertical deflection coil of the deflection yoke 7 as previously described.

Referring once again to FIG. 10, the signal generator circuit 71 derives timing signals $\Phi_0$ through $\Phi_3$, which are shown in FIGS. 11D through 11G. The timing signals $\Phi_0$ through $\Phi_3$ are supplied to multiplexers 72 and 73. The multiplexer 72 is provided with 16 position adjusting levels 74 so that a voltage with a level selected by the timing signals $\Phi_0$ through $\Phi_3$ is generated from the multiplexer 72. The output voltage of the multiplexer 72 is supplied through a buffer circuit 75 to a preamplifier 76.

The multiplexer 73 is supplied with 16 inclination adjusting levels 77, and the timing signals $\Phi_0$ to $\Phi_3$ select the voltage level generated by the multiplexer 73. The resultant voltage is supplied through a level adjusting circuit 78 as an integrator 79. Further, the signal Sl is supplied through a buffer circuit 80 to a reset means 81 which is a transistor in the integrator 79. The output of the integrator 79 is supplied to the pre-amplifier 76.

The pre-amplifier generates a step-deflection waveform signal in which the height of a starting end of each step is determined by the level 74 and the inclination of each step is determined by the level 77, as shown in FIG. 11H. The step deflection waveform signal from the pre-amplifier 76 is supplied through an output circuit 82 to a horizontal deflection coil 83 of the deflection yoke 7.

According to the circuits shown in FIGS. 8 and 10, the deflection waveform in the other direction is formed similar to the step deflection waveform, with the result that the inclination of the scanning line is removed. Therefore, the scanning line crosses the centers of all fluorescent trios 4 as shown in FIG. 9, thus making it possible to provide a satisfactory display without irregularities in luminance.

It is preferable that the levels 74 and 77 are adjusted in practice by visually confirming the scanning line while the display in each scanning element 8 is performed. At that time, by adjusting and correcting the inclination of the scanning line, it is possible to remove any fluctuations due to the scatter of each display element. Furthermore, according to the above-described circuit arrangement, it is possible to perform the deflection of the electron beam in which the index elements I and the fluorescent trios 4 are alternately scanned.

Figure 12B:
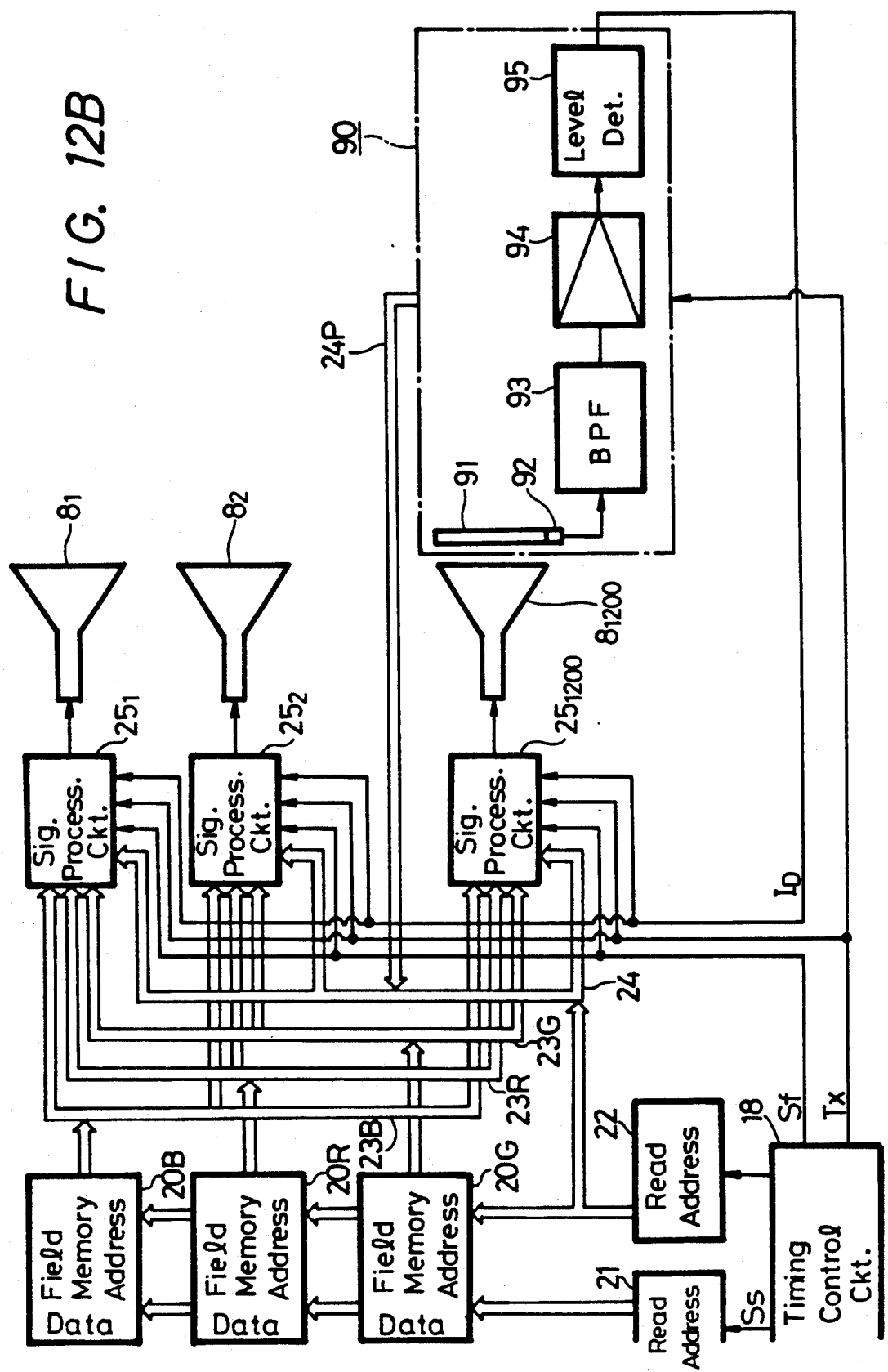
FIG. 12 is a block circuit diagram of another embodiment of the overall circuit arrangement for a CRT-matrix type video display system according to the present invention.

A second example of a circuit arrangement is shown in FIG. 12 which shows the overall circuit of the present invention. In FIG. 12, circuits and or block elements corresponding to those shown in FIG. 7 are marked with corresponding characters and therefore have not been described in detail.

In the embodiment of FIG. 12, the front side of the big screen is formed by the picture cells $8_1, 8_2, \ldots 8_{1200}$ and photo detecting equipment 90 is slidably mounted at the front side of the big screen. More specifically, the photo detecting equipment 90 is provided with a photo pickup plate 91 of such configuration that it can cover the display screen 5 of one of the display cells 8. Light picked up from the display screen 5 by the photo pickup plate 91 is supplied to a photo detector 92, which forms a signal therefrom that is supplied through a noise eliminating bandpass filter 93 and an amplifier 94 to a level detector 95. The level detector derives a signal $I_D$ having a timing corresponding to the light emission of the fluorescent layers B, R and G. The slidable mounting of the photo detecting equipment 90 will be described later.

When the timing control circuit 18 generates a signal $T_X$ indicating a certain adjustment mode prior to the reproduction of a picture the signal $T_X$ is supplied to the signal processing circuits $25_1, 25_2, \ldots 25_{1200}$, whereby the display of all "white" is performed by each of the display cells $8_1, 8_2, \ldots 8_{1200}$. The signal $I_D$ detected by the photo detecting equipment 90 is supplied to the signal processing circuits $25_1, 25_2, \ldots 25_{1200}$. Simultaneously, information on the slide position of the photo detecting equipment 90 is encoded and supplied through a bus line $24_p$ to the address bus 24.

Figure 13:
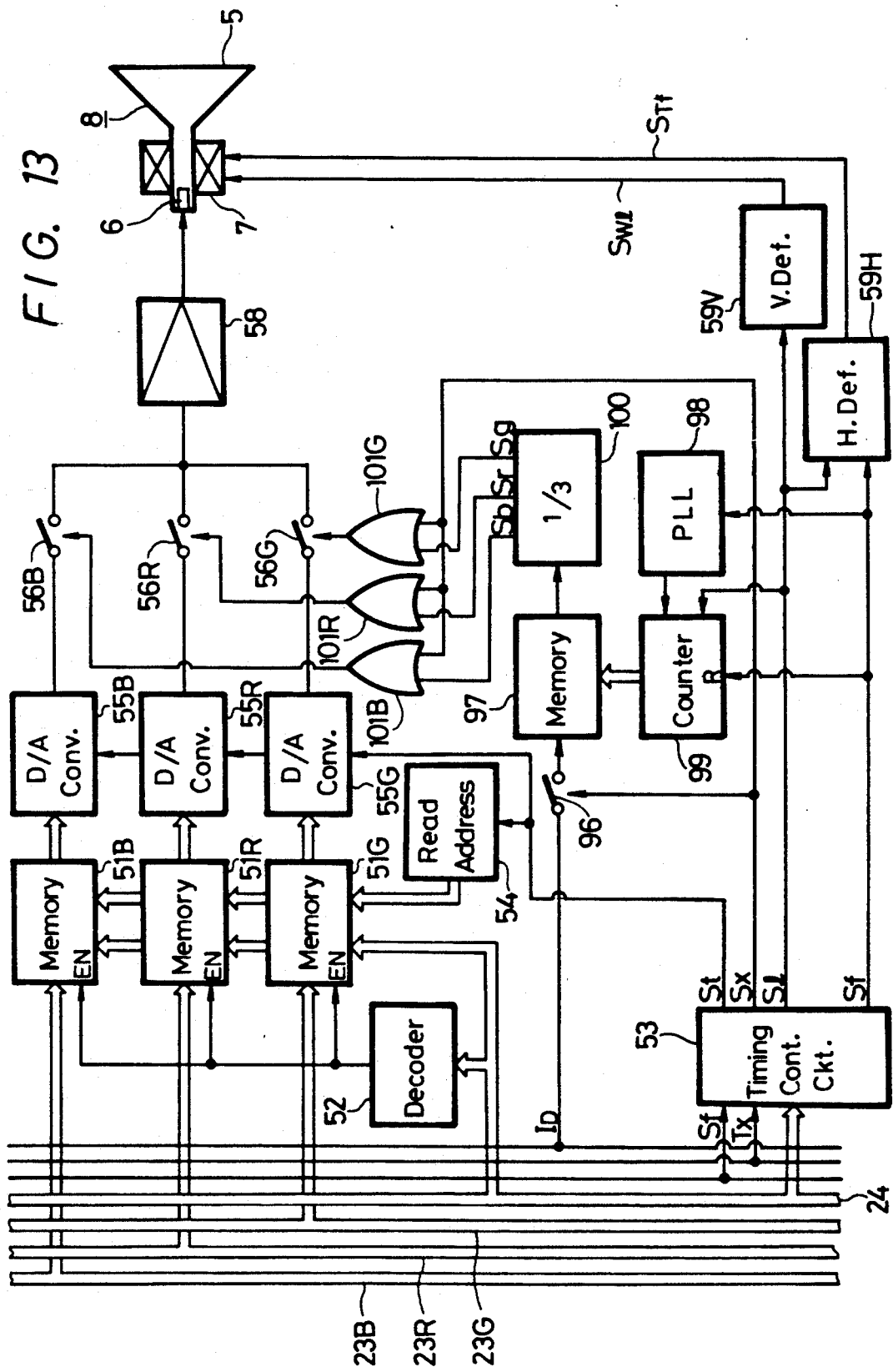
FIG. 13 is a block circuit diagram showing a practical circuit arrangement for a signal processing circuit for use in the circuit of FIG. 12.

One of the signal processing circuits 25 of FIG. 12 is shown in detail in the circuit diagram of FIG. 13. In FIG. 13, circuits and or block elements corresponding to those shown in FIG. 8 are marked with corresponding reference characters and therefore have not been described in detail. Focusing mainly on the differences between the circuits shown in FIGS. 8 and 13, first of all, the signal Sl in the present case is formed by multiplying the signal Sf in frequency by 8 instead of 16 because the display device utilized in FIGS. 12 and 13 is not provided with index elements such as those shown in FIG. 9.

The next difference in the above-described adjustment mode, is that data indicating a maximum brightness level is written in all addresses in the memories 51B, 51R and 51G, for example. When the signal $T_X$ indicative of the above-described adjustment mode is supplied to the timing control circuit 53, the timing control circuit 53 identifies when the slide position is coincident with the position of a corresponding display element 8, the timing control circuit 53 generates an inside signal $S_X$ indicative of the adjustment mode. The signal $S_X$ is mixed with the signals $S_B$, $S_R$ and $S_G$ by OR circuits 101B, 101R and 101G, respectively, and the switches 56B, 56R and 56G are simultaneously turned ON or OFF by the signal $S_X$, as a result.

In the adjustment mode period, the switches 56B, 56R and 56G are simultaneously turned ON and the whole surface of the display screen 5 is scanned by maximum brightness data written in the memories 51B, 51R and 51G so that all fluorescent layers B, R and G are driven to become luminous at the maximum brightness. This results in the whole screen surface being displayed in "white".

The light emission from the fluorescent layers B, R and G is detected by the photo detecting equipment 90 to generate the signal $I_D$. The signal $I_D$ is supplied through the switch 96 to the memory 96 when the switch 96 is turned on by the signal $S_X$.

The signal Sf from the timing control circuit 53 is supplied to the phase locked loop 98 from which there is derived a clock signal of about 25 kHz synchronized with the signal Sf. The clock signal is supplied to a count input terminal of the counter 99, and the signal Sl from the timing control circuit 53 is supplied to a higher count input terminal of the counter 99. Further, the signal Sf is supplied to a reset terminal R of the counter 99. The counter 99 produces a count output which is supplied to the memory 97. The count value of the count output signal from the counter 99 corresponds to the scanning of the electron beam e, accordingly, and by the signal $I_D$ corresponding to the positions of the fluorescent layers B, R and G, the positional information is stored in the memory 97 as scanning information.

In the period except the adjustment mode, the counter 99 is driven similar to the adjustment mode. The aforementioned scanning information is read-out from the memory 97 in response to the count value. The scanning information is supplied to the ⅛ frequency divider circuit 100 which derives the selecting signals Sb, Sr and Sg corresponding to the scanning position information of the fluorescent layers B, R and G latched in the adjustment mode.

Figure 14:
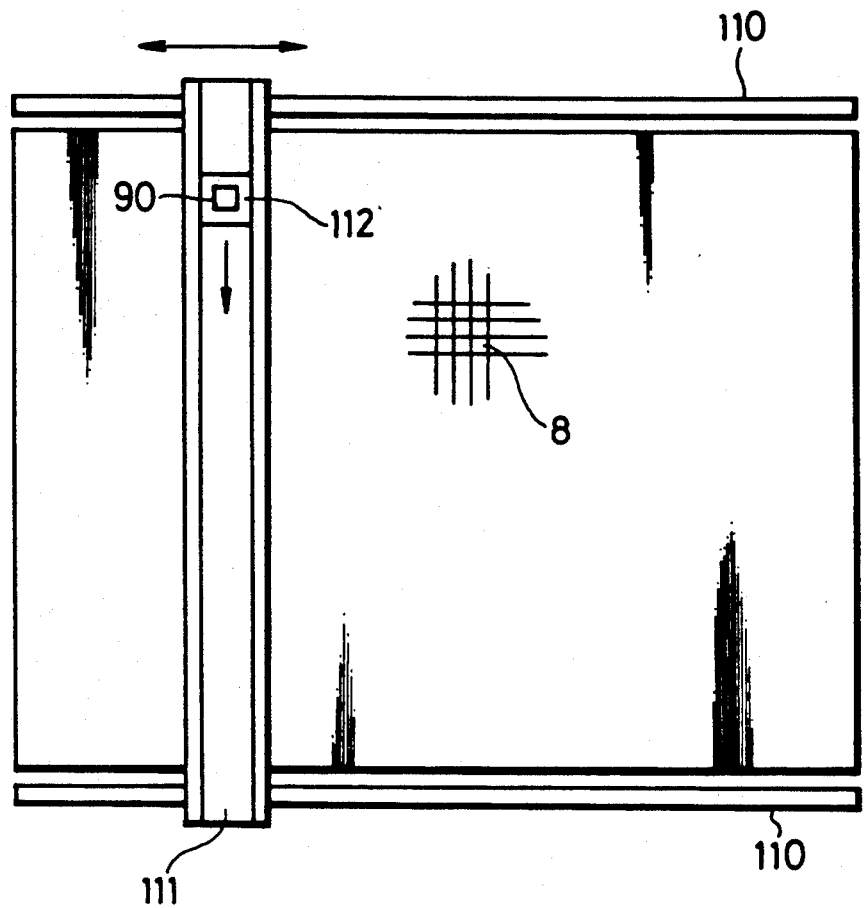
FIG. 14 is a front view of an entire display apparatus as used in the circuits of FIGS. 12 and 13.

In FIG. 14 is shown a front view of an overall arrangement of the display apparatus of FIGS. 12 and 13.

As shown in FIG. 14, rails 110 are provided on the top and bottom of the big screen formed by the combination of the display elements 8. A movable member 111 is supported by the rails 110 and the movable member is movable to the right and left. A gondola 112 is provided on the movable member 111 such that it can be moved up and down. The gondola 112 carries the photo detecting equipment 90 so that it is possible to slide the photo detecting equipment 90 over the whole portion of the big screen. In this way it is possible to obtain the signal $I_D$ of each display element by the photo detecting equipment 90. The slide position information indicative of the display element 8 being detected is generated by a rotary encoder (not shown) or the like provided in a moving means for moving the movable member 111 and the gondola 112.

According to the display apparatus shown in FIGS. 12 and 13, the positional information is detected by the photo detecting equipment and stored in the memory, whereby the video signal can be processed in accordance with the positional information from the memory. Thus, it is possible to obtain a satisfactory video display by this simplified arrangement.

Figure 15:
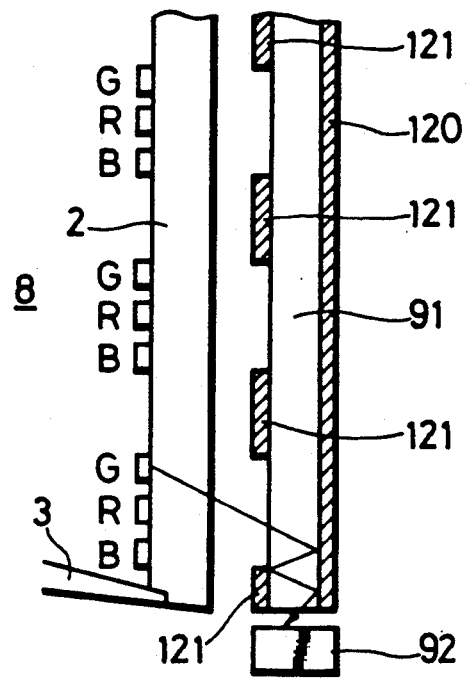
FIG. 15 is a schematic diagram showing an improved photo pickup plate for use in the embodiment of FIGS. 12 and 14.

In the aforementioned apparatus, the photo pickup plate 91 of the photo detecting equipment 90 is an application of a commercially available photo pickup plate in which a phosphor agent is mixed into, for example, an acrylic resin and is molded as a plate. Alternatively, as shown in FIG. 15, reflecting layers 120 and 121 may be formed on the entire rear surface of the photo pickup plate 91 and on surface portions other than those facing the fluorescent layers B, R and G so that the detection efficiency is improved. A light ray from a green phosphor stripe is shown in FIG. 15 entering the photo pickup plate 91 and reflecting into the photo detector 92.

In the above-described apparatus, a method to display "white" on the entire picture screen, when the memories 51B, 51R are written with the appropriate data, provides a signal of "white" level supplied to the analog-to-digital converting circuits 19B, 19R and 19G or data of maximum brightness being supplied to the data buses 23B, 23R and 23G. Alternatively, similar to the example shown in FIG. 8, a switch may be provided at the input side of the drive amplifier 58 wherein a white signal level is supplied through the switch (not shown) to the input side of the drive amplifier 58 during the period of the signal Sx.

The above described apparatus includes a horizontal deflecting circuit 59H for forming the step-wave deflection waveform, the horizontal deflecting circuit 59H being constructed in the same way as shown in FIG. 10.

By comparison of the respective waveforms shown in FIGS. 11A through 11G with those in FIGS. 16A through 16G, it is clear that the signal Sl results from multiplying the signal Sf by 8 instead of 16 as in the circuit of FIG. 13. As a result, in the circuit of FIG. 10, the signal generator circuit 71 generates signals $\Phi_1$ through $\Phi_3$ having waveforms as shown in FIGS. 16D, 16E and 16F. The timing signals $\Phi_1$ through $\Phi_3$ are derived from the multiplexers 72 and 73. The multiplexer 72 is provided with eight position adjusting levels 74 by which the voltage level is selected for the above-mentioned signals $\Phi_1$ to $\Phi_3$ as derived from the multiplexer 72. The output signals from the multiplexer 72, as described above, is supplied through the buffer circuit 75 to the pre-amplifier 76.

Further, the multiplexer 73 is provided with eight inclination levels 77 whereby the voltage levels selected by the above-mentioned signals $\Phi_1$ through $\Phi_3$ is derived from the multiplexer 73. The resulting voltage is supplied through the level adjusting circuit 78 to the integrator 79, the output of the integrator being supplied to the pre-amplifier 76. As above, the signal Sl is supplied through the buffer circuit 80 to the reset means, or transistor in the integrator circuit 79.

Thus, the pre-amplifier 76 derives a step-deflection waveform in which the height of the starting end of each step is determined by the level 74 and in which the inclination of each step is determined by the level 77. The step-deflection waveform signal is supplied through the output circuit 82 to the horizontal deflection coil 83 in the deflection yoke 7.

According to the present invention, the deflection waveform for the other direction is formed as a step-deflection waveform so that the inclination of the scanning line is eliminated. Therefore, all scanning lines can scan the center of all of the fluorescent layers R, B and G, and thereby provide a satisfactory display without irregularities in brightness.

Further, in the example in which the index elements I are located between the sets of primary color elements 4 and in the scanning direction, at least when the scanning is started, the index elements I are scanned and the positional information is stored in the memory. Therefore, the video signal can be processed in response to this positional information which results in a satisfactory display from a sample arrangement.

Furthermore, in the example in which the positional information is detected by the photo detecting equipment and is stored in memory, the video signal is processed in accordance with the positional information from the memory, making it possible to provide a satisfactory display by a simplified arrangement.

Although other modifications and changes may be suggested by those skilled in the art, it is the intention of the inventors to embody within the patent warranted hereon all changes and modifications as reasonably and properly come within the scope of their contribution to the art.

We claim:

1. A big screen display system, comprising:
   a plurality of picture tubes arranged in an X-Y matrix form, each of said picture tubes having a picture screen;
   a plurality of stripe shaped self luminous color pixel elements arranged in a predetermined pitch on said plurality of picture screens, said color pixel elements including a plurality of different primary color elements;
   an electron gun mounted in each of said plurality of picture tubes and operable to emit an electron beam into said color pixel elements;
   a signal source connected to supply a plurality of different primary color signals corresponding to said plurality of primary color elements to said electron guns of said plurality of picture tubes;
   deflection means for deflecting said electron beam of each of said plurality of picture tubes in vertical and horizontal directions, said deflection means including
      a first signal generator connected to generate a sawtooth wave signal for deflecting said electron beam in a first direction, and
      a second signal generator connected to generate a step wave signal for deflecting said electron beam in a second direction, said second signal generator comprising:
         waveform adjusting means for said step wave signal to cause said electron beam to cross substantially central portions of said stripe shaped color pixel elements; and
   indexing means for selectively applying said primary color signals to said electron guns in accordance with a position of said electron beam such that said electron beam impinges corresponding ones of said primary color pixel elements.

2. A big screen display system as claimed in claim 1, wherein said first direction corresponds with said vertical direction and said second direction corresponds with said horizontal direction, wherein said pixel elements are arranged with their longitudinal directions aligned in the horizontal direction.

3. A big screen display system, comprising:
   a plurality of picture tubes arranged in an X-Y matrix form, each of said picture tubes having a picture screen;
   a plurality of stripe shaped self luminous color pixel elements arranged in a predetermined pitch on said plurality of picture screens, said color pixel elements including a plurality of different primary color elements;
   an electron gun mounted in each of said plurality of picture tubes and operable to emit an electron beam into said color pixel elements;
   a signal source connected to supply a plurality of different primary color signals corresponding to said plurality of primary color elements to said electron guns of said plurality of picture tubes;
   deflection means for deflecting said electron beam of each of said plurality of picture tubes in vertical and horizontal directions, said deflection means including
      a first signal generator connected to generate a sawtooth wave signal for deflecting said electron beam in a first direction, and
      a second signal generator connected to generate a step wave signal for deflecting said electron beam in a second direction; and
   indexing means for selectively applying said primary color signals to said electron guns in accordance with a position of said electron beam such that said electron beam impinges corresponding ones of said primary color pixel elements, said indexing means comprising:
      photo sensing means provided at each of said plurality of picture tubes for detecting a position of said electron beam and generating corresponding positional data,
      memory means for storing the positional data obtained by said photo sensing means, and
      control means for selectively applying said primary color signals to said electron gun in response to said positional data stored by said memory means.

4. A big screen display system, comprising:
   a plurality of picture tubes arranged in an X-Y matrix form, each of said picture tubes having a picture screen;
   a plurality of stripe shaped self luminous color pixel elements arranged in a predetermined pitch on said plurality of picture screens, said color pixel elements including a plurality of different primary color elements;
   an electron gun mounted in each of said plurality of picture tubes and operable to emit an electron beam into said color pixel elements;
   a signal source connected to supply a plurality of different primary color signals corresponding to said plurality of primary color elements to said electron guns of said plurality of picture tubes;
   deflection means for deflecting said electron beam of each of said plurality of picture tubes in vertical and horizontal directions, said deflection means including
      a first signal generator connected to generate a sawtooth wave signal for deflecting said electron beam in a first direction, and
      a second signal generator connected to generate a step wave signal for deflecting said electron beam in a second direction; and
   indexing means for selectively applying said primary color signals to said electron guns in accordance with a position of said electron beam such that said electron beam impinges corresponding ones of said primary color pixel elements, said indexing means comprising:
      photo detecting equipment movably attached at a front surface of a big screen formed by said plurality of picture screens for detecting a position of said electron beam and for generating positional data indicative of a position of said electron beam,
  memory means for storing said positional data obtained by said photo detecting equipment, and
  control means for selectively applying said primary color signals to said electron gun in response to said positional data stored in said memory means.

5. A big screen display system comprising:
a plurality of picture tubes arranged in an X-Y matrix to form a big screen, each of said plurality of picture tubes having a picture screen;
a plurality of stripe shaped self luminous color pixel elements arranged in a predetermined pitch on said picture screen, said color pixel elements including a plurality of different primary color elements;
an electron gun in each of said picture tubes mounted to emit an electron beam onto said color pixel elements;
a signal source for supplying a corresponding plurality of different primary color signals to said electron guns of said plurality of picture tubes;
deflection means for deflecting said electron beam of each of said picture tube in vertical and horizontal directions;
indexing means including
  photo detecting equipment movably attached at a front surface of the big screen formed by said plurality of picture tubes for detecting a position of said electron beams and generating positional data,
  memory means for storing the positional data obtained by said photo detecting means, and
  control means for selectively applying said primary color signals to said electron guns in response to said positional data stored by said memory means.

6. A big screen display system, comprising:
a plurality of picture tubes arranged in an X-Y matrix to form a big screen, each of said plurality of picture tubes having a picture screen;
a plurality of stripe shaped self luminous color pixel elements arranged in a predetermined pitch on said picture screen, said color pixel elements including a plurality of different primary color elements;
a plurality of index elements arranged between said color pixel elements in a predetermined pitch on said picture screen corresponding to said predetermined pitch of said color pixel elements, wherein said index elements are arranged between said color pixel elements such that border peripheral portions between any neighboring two picture tubes are eliminated;
an electron gun mounted in each of said picture tubes to emit an electron beam onto said color pixel elements and said index elements;
a signal source for supplying a corresponding plurality of different primary color signals to said electron guns of said plurality of picture tubes;
deflection means for deflecting said electron beam of each of said picture tubes in vertical and horizontal directions, said deflection means includes
  a first signal generator connected to generate a sawtooth wave signal for deflecting said electron beam in one direction and
  a second signal generator connected to generate a step wave signal for deflecting said electron beam in the other direction, said second signal generator generates a compensated step wave signal at a beginning of every scanning period in said other direction such that said compensated step wave signal firstly makes said electron beam scan first line-up index elements, secondly makes said electron beam go back to first line-up color picture elements, and thirdly makes said electron beam go forward and scan said first line-up index elements again; and
indexing means including a photo detector mounted to detect positional data of said index elements and operable to selectively apply said primary color signals to said electron guns in accordance with said positional data detected by said photo detector such that corresponding primary color pixel elements are impinged thereby.

* * * * *